(12) United States Patent
Chen

(10) Patent No.: US 10,342,375 B2
(45) Date of Patent: Jul. 9, 2019

(54) MOBILE-PHONE CONTROLLED INTELLIGENT STEAM COOKER

(71) Applicant: HANGZHOU TUOHAI ELECTRONIC CO., LTD, Hangzhou, Zhejiang (CN)

(72) Inventor: Guozhang Chen, Hangzhou (CN)

(73) Assignee: HANGZHOU TUOHAI ELECTRONIC CO., LTD, Hangzhou, Zhejiang Province (CN)

( * ) Notice: Subject to any disclaimer, the term of this patent is extended or adjusted under 35 U.S.C. 154(b) by 447 days.

(21) Appl. No.: 15/259,125

(22) Filed: Sep. 8, 2016

(65) Prior Publication Data

US 2017/0007064 A1    Jan. 12, 2017

(30) Foreign Application Priority Data

| Jul. 9, 2015 | (CN) | 2015 1 0399521 |
| Jan. 23, 2016 | (CN) | 2016 1 0043070 |
| Apr. 8, 2016 | (CN) | 2016 1 0213892 |
| Jun. 28, 2016 | (CN) | 2016 2 0653571 U |

(51) Int. Cl.
*A47J 27/04* (2006.01)
*A47J 27/16* (2006.01)
*A47J 27/14* (2006.01)
*A47J 36/32* (2006.01)

(52) U.S. Cl.
CPC ............... *A47J 27/04* (2013.01); *A47J 36/32* (2013.01); *A47J 2027/043* (2013.01)

(58) Field of Classification Search
CPC ................... A47J 27/04–088; A47J 27/13–18

USPC .................................................. 392/324–328
See application file for complete search history.

(56) References Cited

U.S. PATENT DOCUMENTS

| 9,702,858 B1* | 7/2017 | Minvielle | G01N 33/02 |
| 2015/0030728 A1* | 1/2015 | Raghavan | A23B 4/0523 |
| | | | 426/231 |
| 2015/0190008 A1* | 7/2015 | Baraille | A47J 27/0802 |
| | | | 99/342 |
| 2016/0324359 A1* | 11/2016 | Aboujassoum | A47J 36/00 |
| 2016/0360916 A1* | 12/2016 | Utsumi | A47J 27/04 |
| 2017/0164778 A1* | 6/2017 | Utsumi | A47J 27/04 |

* cited by examiner

*Primary Examiner* — Michael A Laflame, Jr.
(74) *Attorney, Agent, or Firm* — Li & Cai Intellectual Property (USA) Office

(57) ABSTRACT

A mobile-phone controlled intelligent steam cooker is provided, including a steam cooker, a remote control server and a mobile terminal. The steam cooker includes a steam pot and a steam oven. The steam oven includes a water tank, a water pump, a steam generator, a check valve connector, and a leakproof check valve. The steam oven includes a power panel and a control panel. The control panel includes a remote Wi-Fi module and a microprocessor. The remote Wi-Fi module receives an instruction from the mobile terminal forwarded by the remote server, and also sends state information of the steam cooker and the latest cloud recipes provided by a developer from the remote server to the mobile terminal. The steam oven includes an operation panel. Local and remote control of the steam cooker through an intelligent terminal is achieved by connecting a communication module to the intelligent terminal.

7 Claims, 13 Drawing Sheets

MOBILE-PHONE CONTROLLED INTELLIGENT STEAM COOKER

BACKGROUND OF THE INVENTION

Field of the Invention

The present invention relates to the technical field of smart home, and more particularly to a mobile-phone controlled intelligent steam cooker.

Description of the Related Art

Because food cooked in a steam cooker has good taste and the nutrition of the food is not destroyed but maintained as the steam cooker is always permeated with steam during the cooking, the conventional hotpot eating method is changed, and the steam cooker becomes increasingly popular with promotion of a healthy lifestyle. However, the existing steam cookers are bulky, and are unsuitable for use in most of small families; moreover, it is very rare to cook, using a cooking kitchenware, especially a steam cooker, following prompts of a recipe program according to an APP installed on a mobile phone.

The existing steam cookers are mainly divided into two types. In one type, water in a seat is heated to produce steam, and the steam rises and enters a steam pot for steaming food in the cooker body, for example, a multifunctional steam cooking machine disclosed in China Publication No. CN105054763A (Application No. 201510533901.1) in which it takes at least two minutes to produce steam by heating water. In the other type, high-pressure steam is used to rapidly heat food, for example, a steam hotpot disclosed in Chinese Utility Model Patent No. CN202619334U in which steam is produced by a steam furnace and is delivered through a pipe into a hotpot for heating food; however, the steam hotpot is difficult to carry because the steam furnace is large and heavy, and is high in power consumption and high in cost.

SUMMARY OF THE INVENTION

The present invention is provided to overcome the deficiencies in the prior art.

To solve the above technical problem, the basic technical solution provided by the present invention is a mobile-phone controlled intelligent steam cooker, including: a mobile-phone controlled intelligent steam cooker, wherein the intelligent steam cooker includes a steam cooker, a remote control server and a mobile terminal; the steam cooker includes a steam pot and a steam oven; the steam oven is internally provided with a water tank, a water pump, a steam generator, a check valve connector, and a leakproof check valve disposed in the steam pot and connected to the check valve connector; the steam oven is further internally provided with a power panel and a control panel; the control panel is installed with a remote Wi-Fi module and a microprocessor; the remote Wi-Fi module receives, over the Internet, an instruction from the mobile terminal forwarded by the remote server, and also sends, over the Internet, state information of the steam cooker and the latest cloud recipes provided by a developer from the remote server to the mobile terminal; and the steam oven is further provided with an operation panel.

Preferably, the mobile terminal is a smart phone that runs APPs supporting Android and IOS phone operating systems.

Preferably, the leakproof check valve on the steam pot is configured to be directly sleeved on the check valve connector on the steam oven, and the check valve connector is provided with an O-shaped silicon rubber seal ring.

Preferably, the water tank is annular, provided with a water outlet at the bottom, made of high-strength organic glass, and provided with measurement marks on the surface, a top cover of the water tank being provided with 2 to 6, preferably 4, LED lamps, wherein each of the LED lamps is a color changing LED lamp.

Preferably, the leakproof check valve is a silencing leakproof check valve; the silencing leakproof check valve includes a valve seat, a valve plug, a valve plug spring, a leakproof seal ring, a valve cover, and a silencer; the silencer includes a silencing cover and a reed; the silencing cover and the reed are connected by using a rivet, pins of the reed are installed in a groove of the valve cover, the silencing leakproof check valve is fixed on the steam cooker body through connection of the valve seat and the valve cover, a valve seat seal ring is provided between the valve seat and the steam cooker body, the valve seat is sleeved on an air inlet connector, the air inlet connector is fixed on the steam oven by using a locking nut, the air inlet connector is provided with an O-shaped seal ring, and the reed of the silencer is provided with four pins; the leakproof seal ring and the valve seat seal ring are made of a silicon rubber material, the O-shaped seal ring is made of a silicon rubber material, and the remaining parts of the silencing leakproof check valve are made of a stainless steel material; the valve cover is provided with four air vents, and the air vents are communicated with a cavity formed by the valve cover and the silencing cover and are eventually communicated with an inner cavity of the steam cooker body.

Preferably, the leakproof check valve includes a valve cover, a valve seat, a valve plug, a valve plug spring, and a connection joint; the valve plug is provided with a leakproof seal ring, and in a non-working state, an inclined plane of the leakproof seal ring is closely attached to an inclined plane of the valve seat; the valve seat and the valve cover are connected to the cooker body, a valve seat seal gasket is provided between the valve seat and the cooker body, the valve plug and the valve plug spring are placed in a cavity of the valve seat, an O-shaped seal ring is provided between the connection joint and the inner cavity of the valve seat, the connection joint is fixedly connected to the oven body of the steam cooker, and a joint seal gasket is further provided between the connection joint and the oven body of the steam cooker; the leakproof seal ring and the O-shaped seal ring are made of a silicon rubber material; the valve cover is provided with air vents, the air vents are communicated with an inner cavity of the cooker body, the valve cover is provided with 4 to 6, preferably 4, air vents; the valve cover, the valve seat, the valve plug, and the connection joint are made of a stainless steel material, and the valve plug spring is made of a stainless spring steel wire.

A mobile-phone controlled intelligent steam cooker is provided, including a cooker body and an oven body, wherein the oven body is internally provided with a steam generator, a micro water pump, and a leakproof connection joint connected to the cooker body; the leakproof connection joint includes a joint cover, a joint seat, a joint core, and a semi-spherical piston; the joint cover in the leakproof connection joint is provided with four air vents, a leakproof gasket is provided at a position where the joint cover and the joint seat are connected to the bottom of the cooker body, and an O-shaped heat-resistant gasket is provided between the joint core and the joint seat; the oven body is further internally provided with a control circuit, the control circuit is a simple switch circuit, a microcomputer variable-frequency variable-voltage control circuit, or another intelligent control circuit capable of controlling temperature and time; the intelligent control circuit is a circuit composed of a temperature control module, a power control module, a time control module, a communication module, and a microprocessor; and the communication module in the intelligent control circuit is configured to wirelessly connect to an intelligent terminal for receiving an instruction sent by the intelligent terminal.

The present invention has the following advantages. The input power of the steam generator can be adjusted according to different types and quantities of food. Local and remote control of the steam cooker through an intelligent terminal is achieved by connecting the communication module in the intelligent control circuit to the intelligent terminal. The overall machine is small in size and can be easily moved as required, steam is produced quickly and it only takes ten seconds to produce steam after startup, food can be cooked rapidly and efficiently, power is saved, and the steam pot and the steam oven can be easily separated. The cloud recipes on the mobile terminal are continuously updated by the developer, users are instructed to prepare food materials following prompts of the recipes and all it takes is to press the recipe program, such that the users can eat well and healthy according to the provided health-preserving recipes. The overall design of the steam cooker is fashionable and simple, and the flying saucer-shaped appearance and the annular high-strength organic glass water tank equipped with LED lamps can brighten up the modern home kitchen. By disposing the leakproof seal ring on the vertically moving valve plug, the inclined plane of the leakproof seal ring is fully attached to the inclined plane of the valve seat when the valve plug moves downward, and thus the sealing effect is very good and backflow of the steam can be effectively prevented. By installing the silencer on the valve cover, a long air passage may not be formed to cause whistle of the steam discharged from the air vents. The leakproof seal ring is made of silicon rubber, such that when the steam source is cut off, the leakproof seal ring is attached to the inclined plane of the valve seat, the produced noises are very small, and no metal striking sound is made like a common steam valve, and the leakproof check valve has good repeatability and long service life. The connection of the check valve to the air inlet connector is done by sleeving the valve seat on the air inlet connector and is sealed by using an O-shaped seal ring, whereby the steam cooker body can be easily separated from the steam oven, and after cooking each time, the steam cooker body can be easily removed for cleaning and drying.

DETAILED DESCRIPTION OF THE PREFERRED EMBODIMENTS

Figure 1:
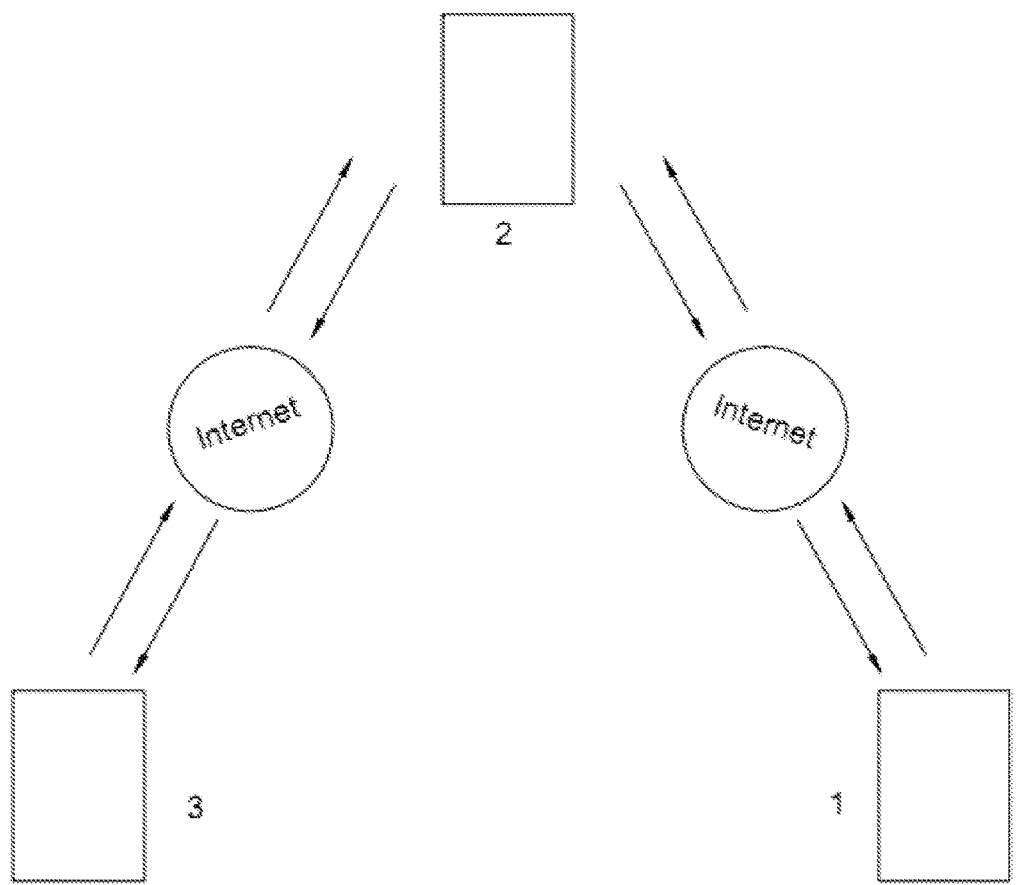
FIG. 1 is a control schematic diagram of a mobile-phone controlled intelligent steam cooker according to the present invention.
Figure 2:
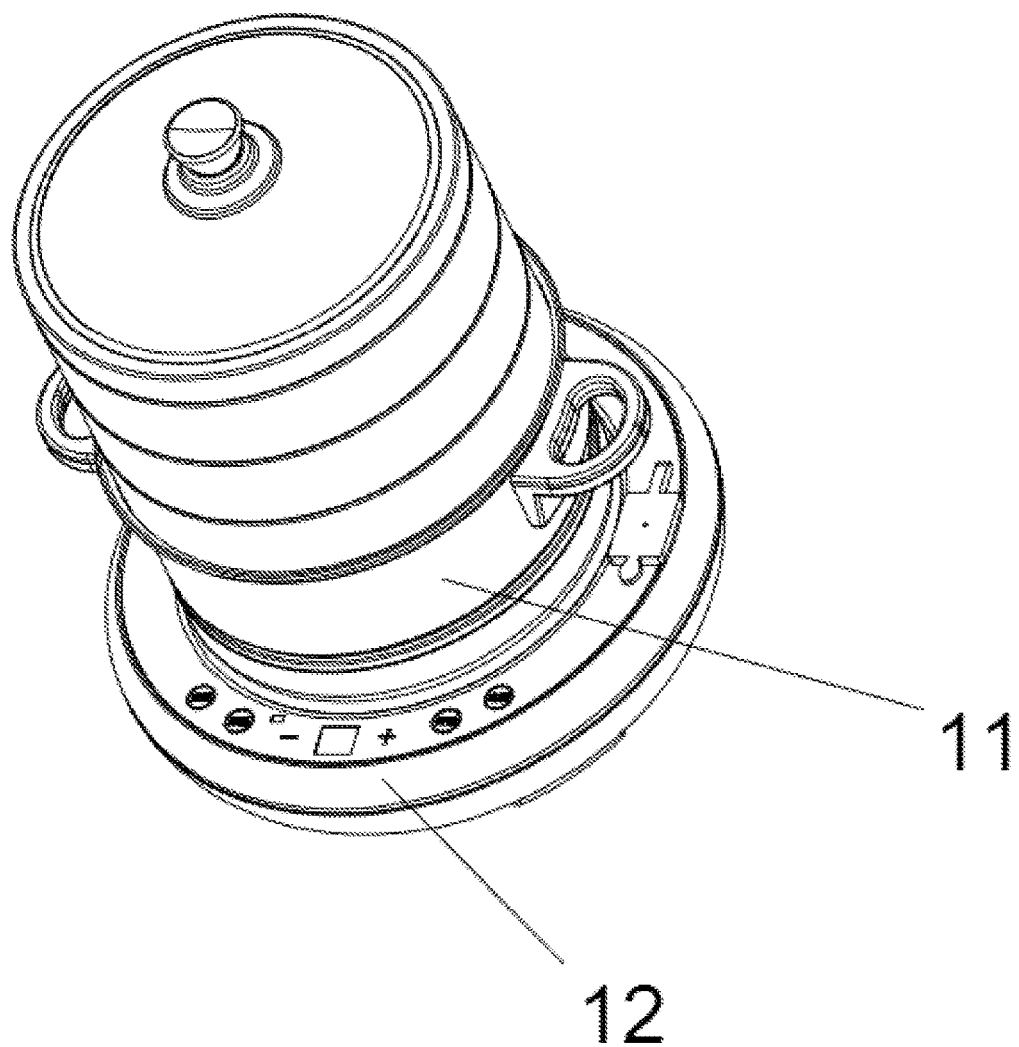
FIG. 2 illustrates a multilayered steam cooker in the mobile-phone controlled intelligent steam cooker according to the present invention.
Figure 3:
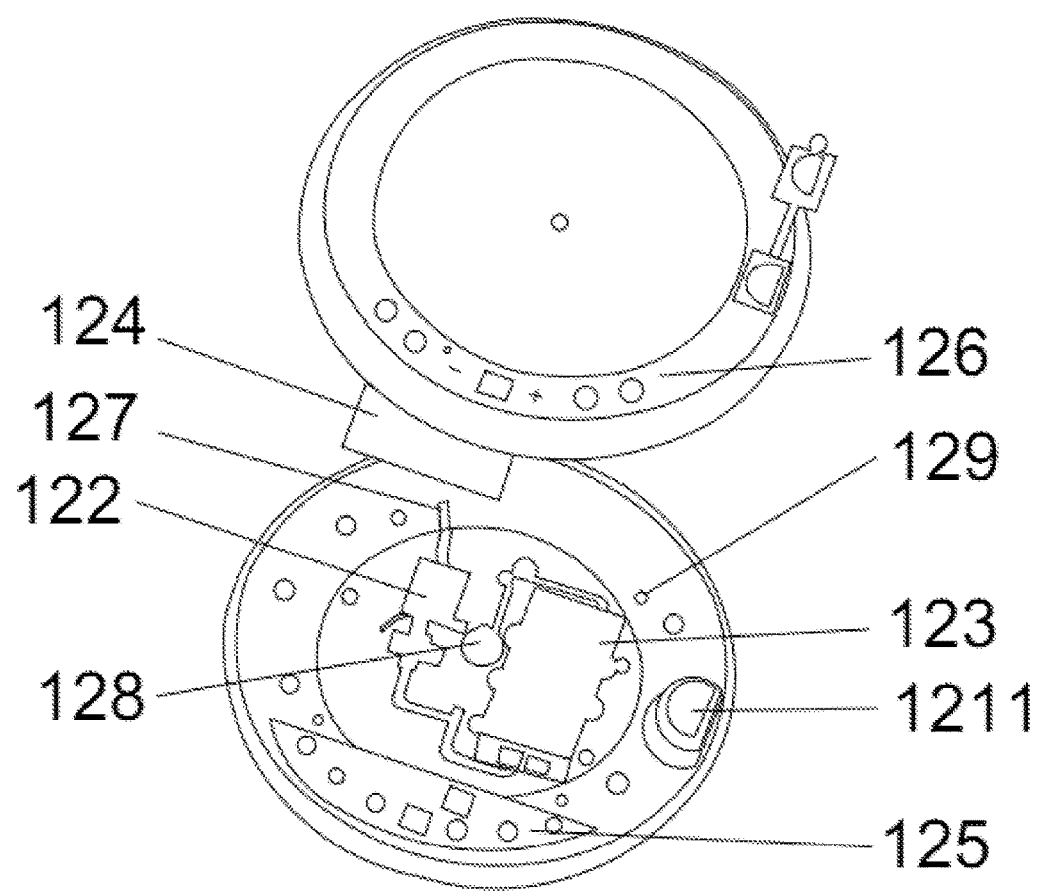
FIG. 3 is an exploded diagram of a steam oven in the mobile-phone controlled intelligent steam cooker according to the present invention.
Figure 4:
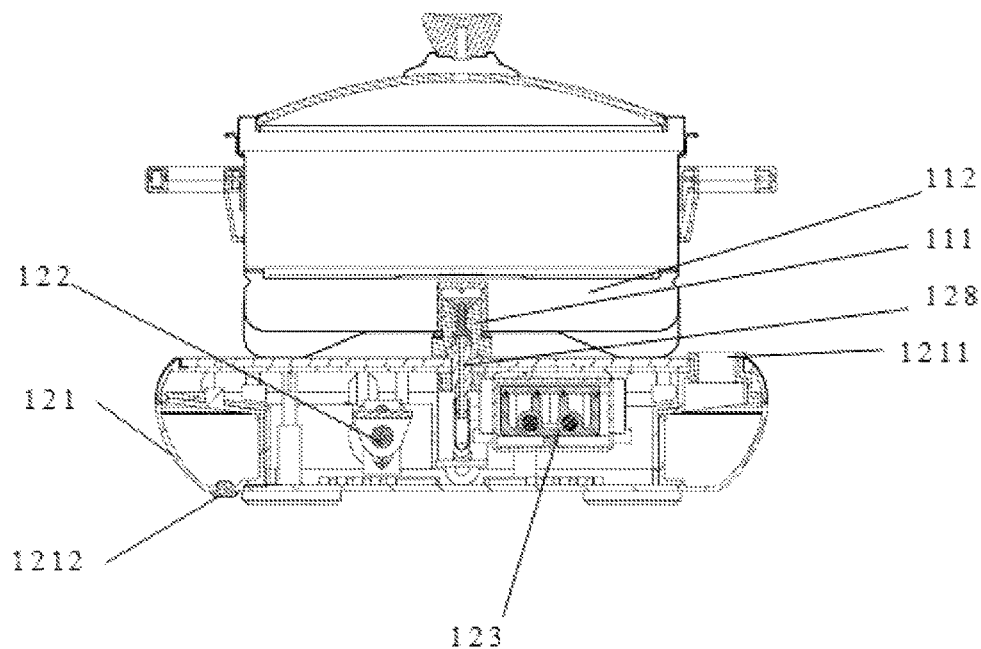
FIG. 4 is a cross-sectional diagram of the steam cooker in the mobile-phone controlled intelligent steam cooker according to the present invention.

The present invention is further illustrated with reference to FIG. 1 to FIG. 15, and the scope of protection of the present invention is not limited thereto.

Embodiment 1

As shown in FIG. 1 to FIG. 4, a mobile-phone controlled intelligent steam cooker is provided. The intelligent steam cooker includes a steam cooker 1, a remote control server 2 and a mobile terminal 3. The steam cooker 1 includes a steam pot 11 and a steam oven 12. The steam oven 12 is internally provided with a water tank 121, a water pump 122, a steam generator 123, a check valve connector 128, and a leakproof check valve 111 disposed in the steam pot 11 and connected to the check valve connector 128. The steam oven 12 is further internally provided with a power panel 124 and a control panel 125. The control panel 125 is installed with a remote Wi-Fi module and a microprocessor. The remote Wi-Fi module receives, over the Internet, an instruction from the mobile terminal 3 forwarded by the remote server 2, and also sends, over the Internet, state information of the steam cooker 1 and the latest cloud recipes provided by a developer from the remote server 2 to the mobile terminal 3. The steam oven 12 is further provided with an operation panel 126, and the operation panel 126 enables manual operation of a cooking program.

The remote server 2 is a remote server that is deployed to serve user equipment by the developer, and is installed on the side of the developer.

The mobile terminal 3 is a smart phone that runs APPs supporting Android and IOS phone operating systems.

The working process of the steam cooker 1 is as follows. Pure tap water is added from an inlet port 1211 into the water tank 121. A cooking program on the mobile terminal 3 or the operation panel 126 of the steam oven 12 is pressed according to a dish to be cooked. The water pump 122 and the steam generator 123 start to work, the water pump 122 sucks water from the water tank 121 through a connection pipe 127 of the water tank 121, the water flows through a pipe to reach the steam generator 123 and is heated and pressurized in a U-shaped elongated heating groove of the steam generator 123, and high-pressure steam is finally produced by the steam generator 123. The high-pressure steam passes through the check valve connector 128, lifts up the valve plug of the leakproof check valve 111 in the steam pot 11 and enters a heating chamber 112 of the steam pot. Therefore, the whole cooking process is completed according to setting of the cooking program.

The water tank 121 is annular, provided with a water outlet 1212 at the bottom, made of high-strength organic glass, and provided with measurement marks on the surface, a top cover of the water tank being provided with 2 to 6 LED lamps 129, wherein each of the LED lamps 129 is a color changing LED lamp.

After the steam oven 12 is used for a while, due to the water quality, water scales may be formed in the water pipes, the water pump 122 and the steam generator 123. In this case, dilute citric acid may be filled in the water tank 121, a cleaning program is started on the mobile terminal 3 to clean the whole steam oven 12, and after the cleaning is over, the residual water is drained from the water outlet 1212 of the water tank 121.

The steam oven 12 has a height of ≤60 mm and a diameter of ≤310 mm.

The steam pot 11 is single-layered or multilayer-stacked.

Embodiment 2

Figure 5:
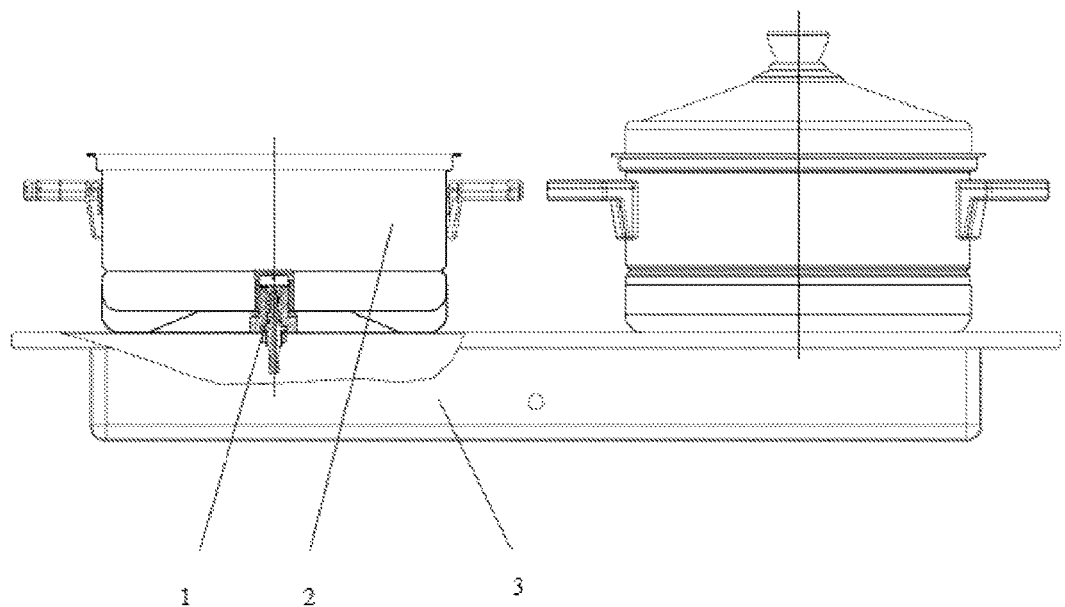
FIG. 5 is a schematic diagram illustrating the installation position of a leakproof check valve in the steam cooker according to the present invention.
Figure 6:
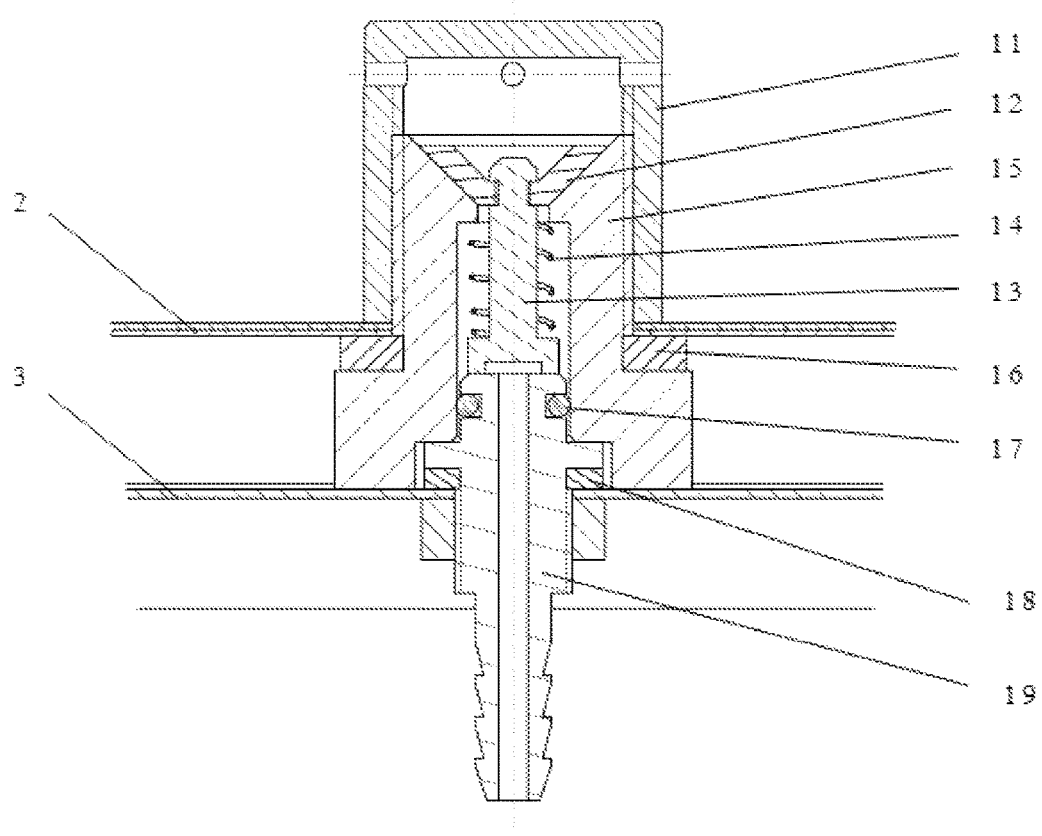
FIG. 6 is a schematic state diagram illustrating the leakproof check valve in a non-working state according to the present invention.
Figure 7:
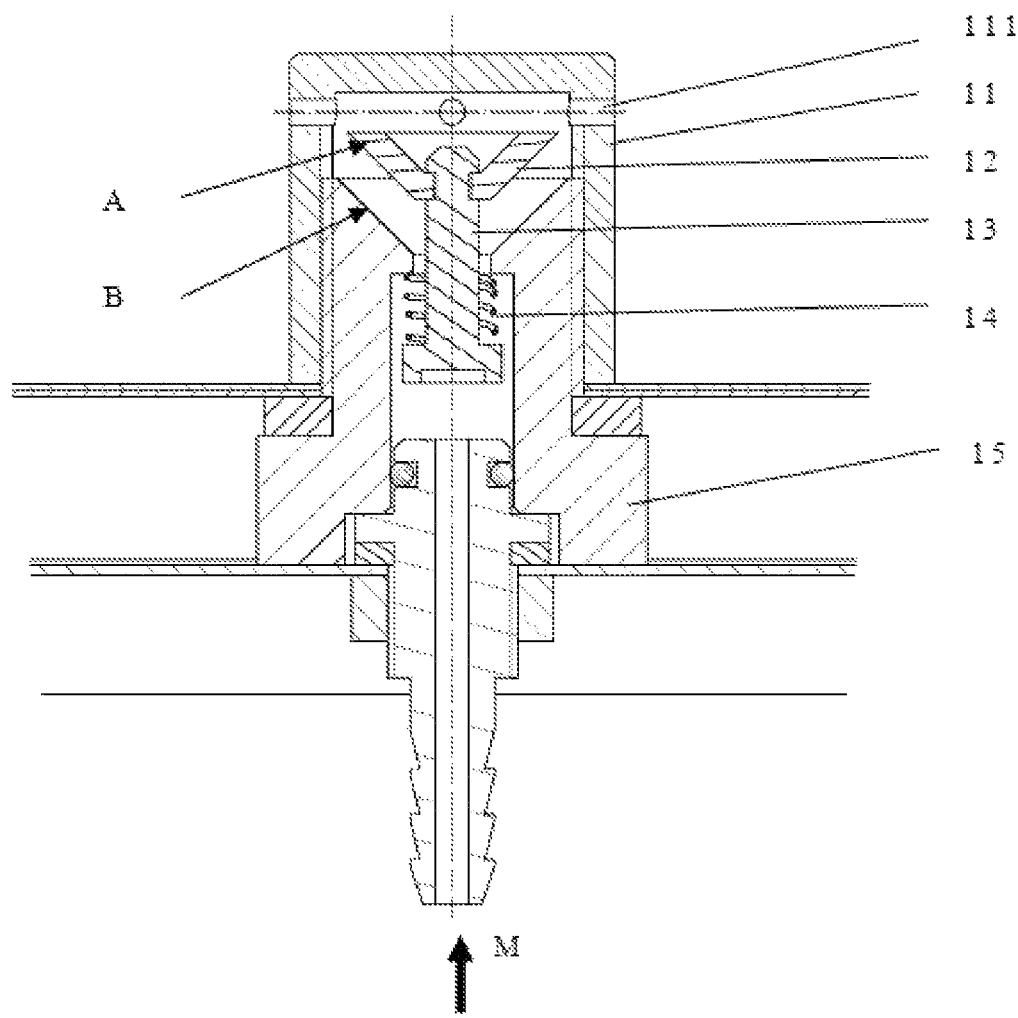
FIG. 7 is a schematic state diagram illustrating the leakproof check valve in a working state according to the present invention.

Referring to FIG. 5 to FIG. 7, the differences between Embodiment 2 and Embodiment 1 lie in that, the leakproof check valve includes a valve cover 11, a valve seat 15, a valve plug 13, a valve plug spring 14, and a connection joint 19; the valve plug 13 is provided with a leakproof seal ring 12, and when the steam supply is stopped, an inclined plane A of the leakproof seal ring 12 is closely attached to an inclined plane B of the valve seat 15, to prevent backflow of steam in the cooker body 2; the valve seat 15 and the valve cover 11 are connected to the cooker body 2, a valve seat seal gasket 16 is provided between the valve seat 15 and the cooker body 2, the valve cover 11 is provided with multiple air vents 111, the air vents 111 are communicated with an inner cavity of the cooker body 2, and the valve plug 13 and the valve plug spring 14 are placed in a cavity of the valve seat 15; the valve plug 13 moves up and down in the cavity of the valve seat 15 under the effect of the steam pressure and the spring force, and also drives the leakproof seal ring 12 to move up and down; an O-shaped seal ring 17 is provided between the connection joint 19 and the inner cavity of the valve seat 15, the connection joint 19 is fixedly connected to the oven body 3 of the steam cooker, and a joint seal gasket 18 is further provided between the connection joint 19 and the oven body 3 of the steam cooker.

An inlet M of the connection joint 19 is a steam inlet. When entering the connection joint 19, the steam pushes the valve plug 13 to move upward against the resistance of the valve plug spring 14, and also drives the leakproof seal ring 12 to move upward. The steam enters the inner cavity of the valve seat, passes through the leakproof seal ring 12 to enter the valve cover 11, and then enters the inner cavity of the cooker body 2 from the air vents 111 on the valve cover 11.

When the steam supply is stopped, the valve plug 13 drives the leakproof seal ring 12 to move downward under the effect of the valve plug spring 14, till the inclined plane A of the leakproof seal ring 12 is completely attached to the inclined plane B of the valve seat 15.

Embodiment 3

Figure 8:
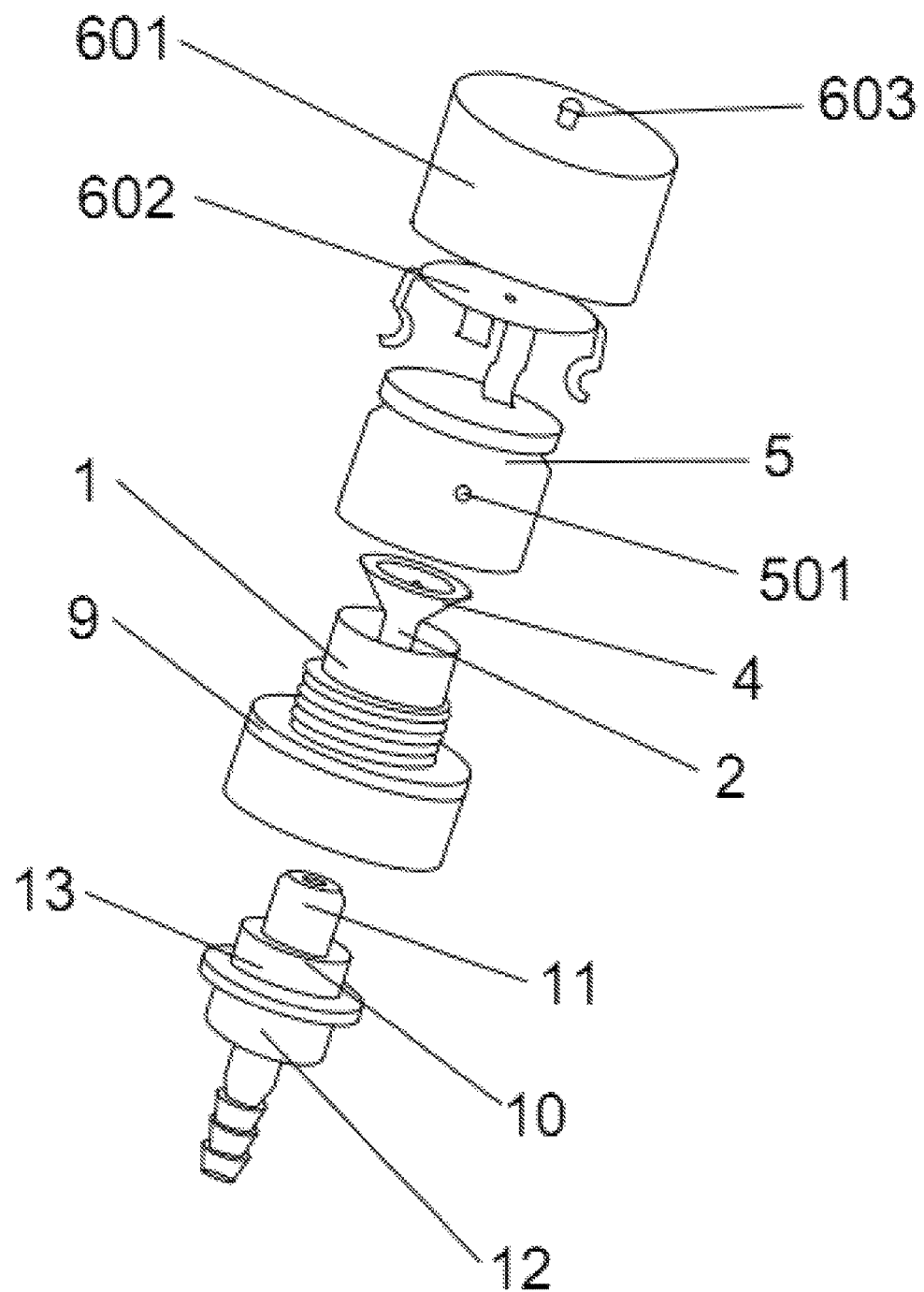
FIG. 8 is an exploded diagram of a silencing leakproof check valve according to the present invention.
Figure 9:
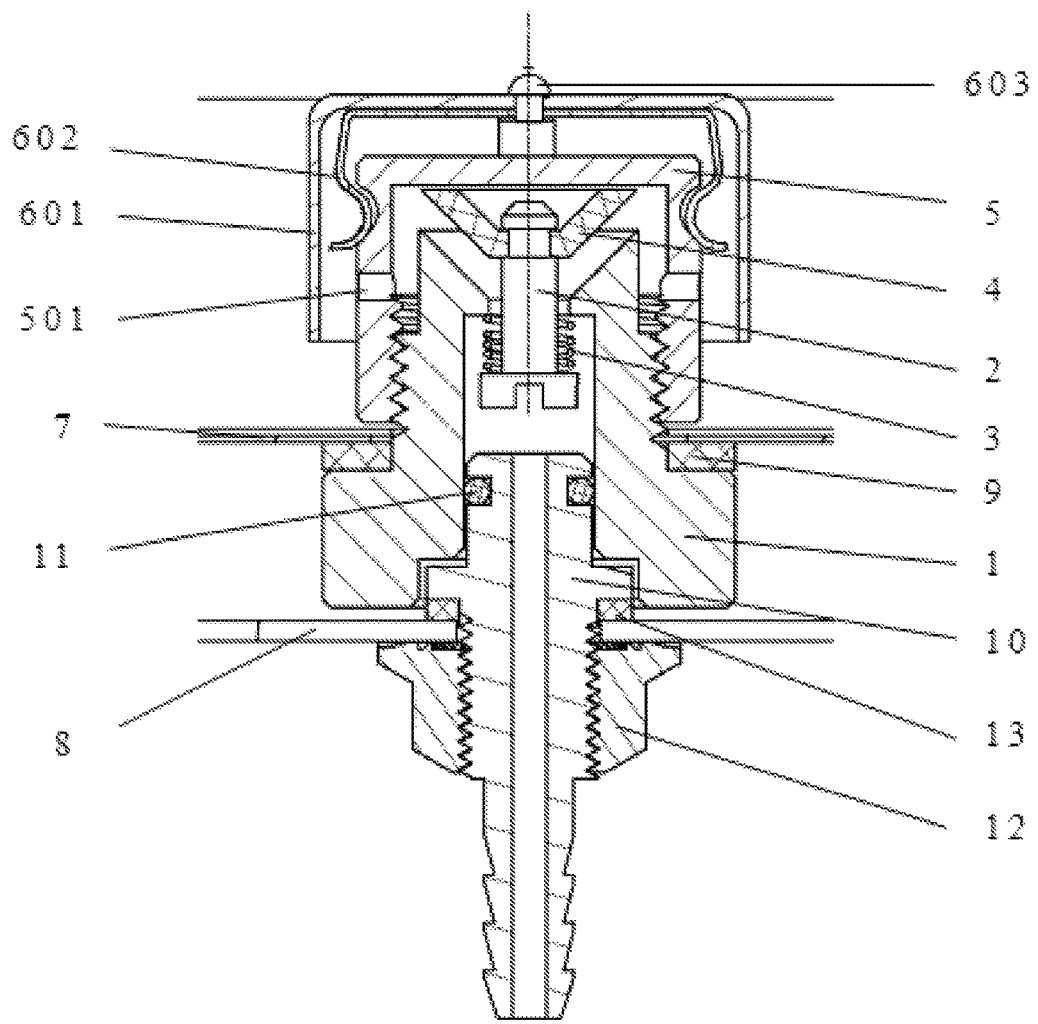
FIG. 9 is a schematic diagram illustrating the working state of the silencing leakproof check valve according to the present invention.
Figure 10:
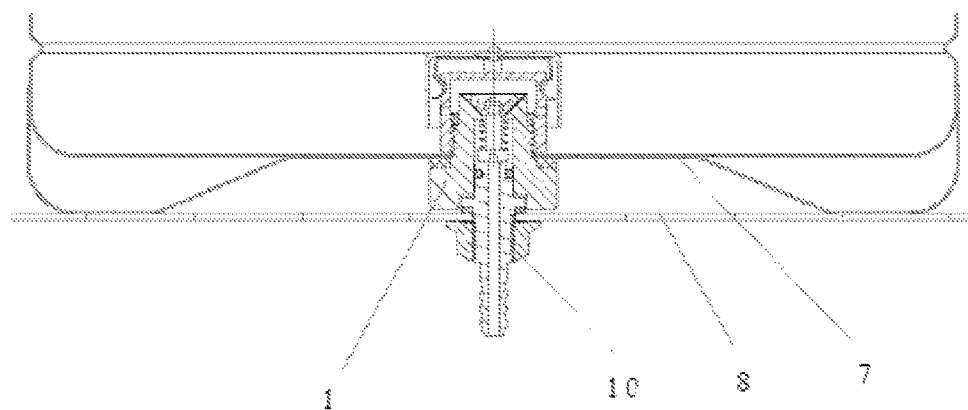
FIG. 10 is a schematic diagram illustrating the installation of the silencing leakproof check valve in the steam cooker according to the present invention.
Figure 11:
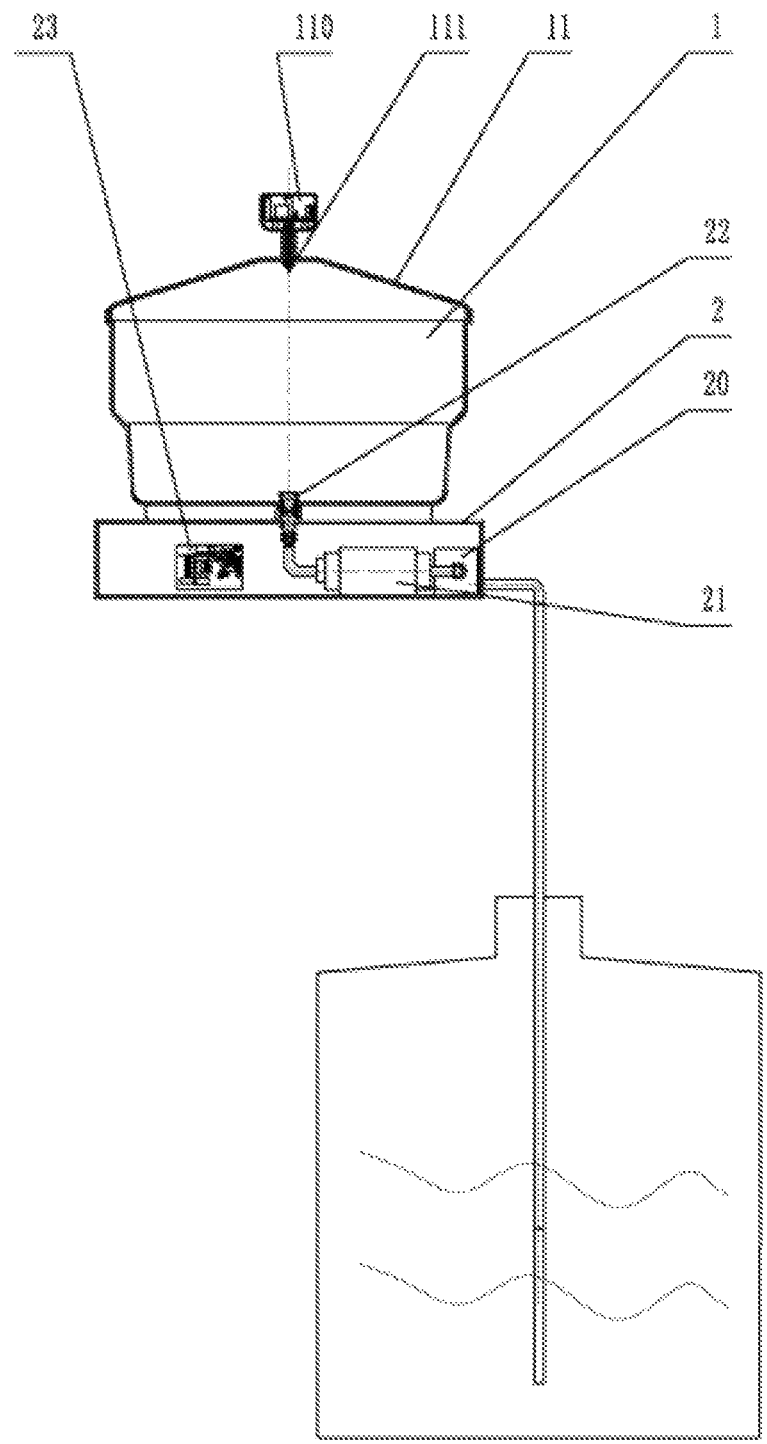
FIG. 11 is a schematic structural diagram of a mobile-phone controlled intelligent steam cooker having a single pot according to the present invention.
Figure 12:
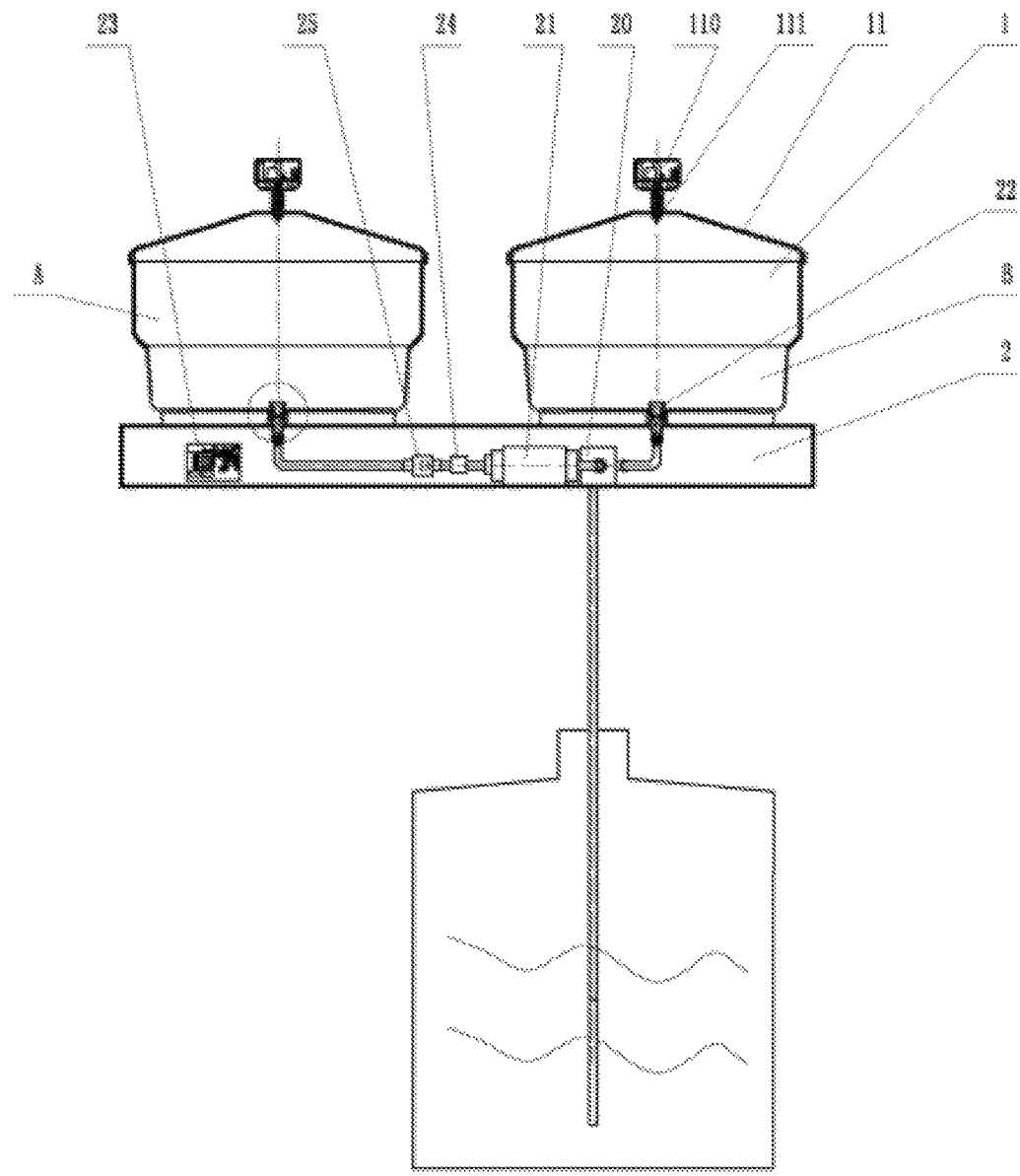
FIG. 12 is a schematic structural diagram of a mobile-phone controlled intelligent steam cooker having double pots according to the present invention.
Figure 13:
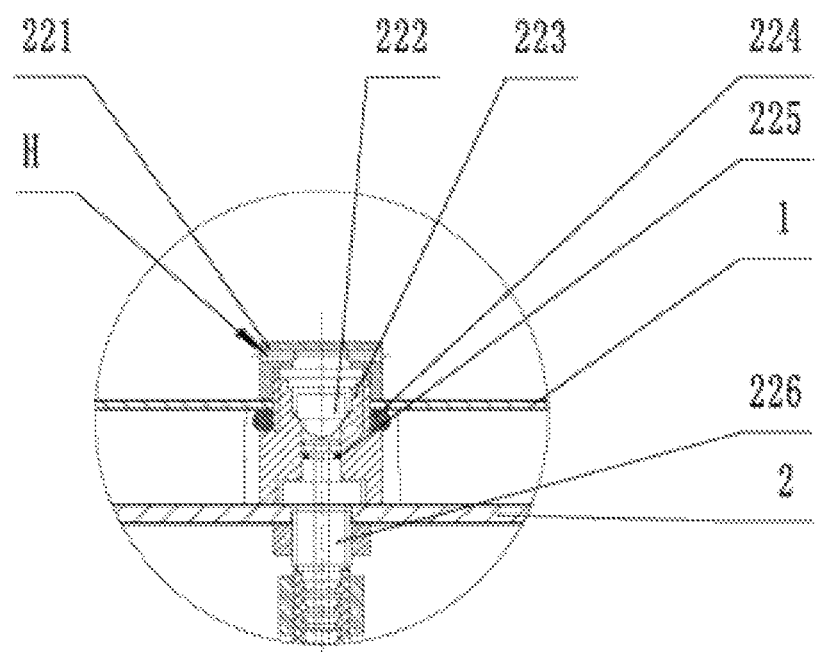
FIG. 13 is a structural diagram of a leakproof connection joint in the mobile-phone controlled intelligent steam cooker having double pots according to the present invention.
Figure 14:
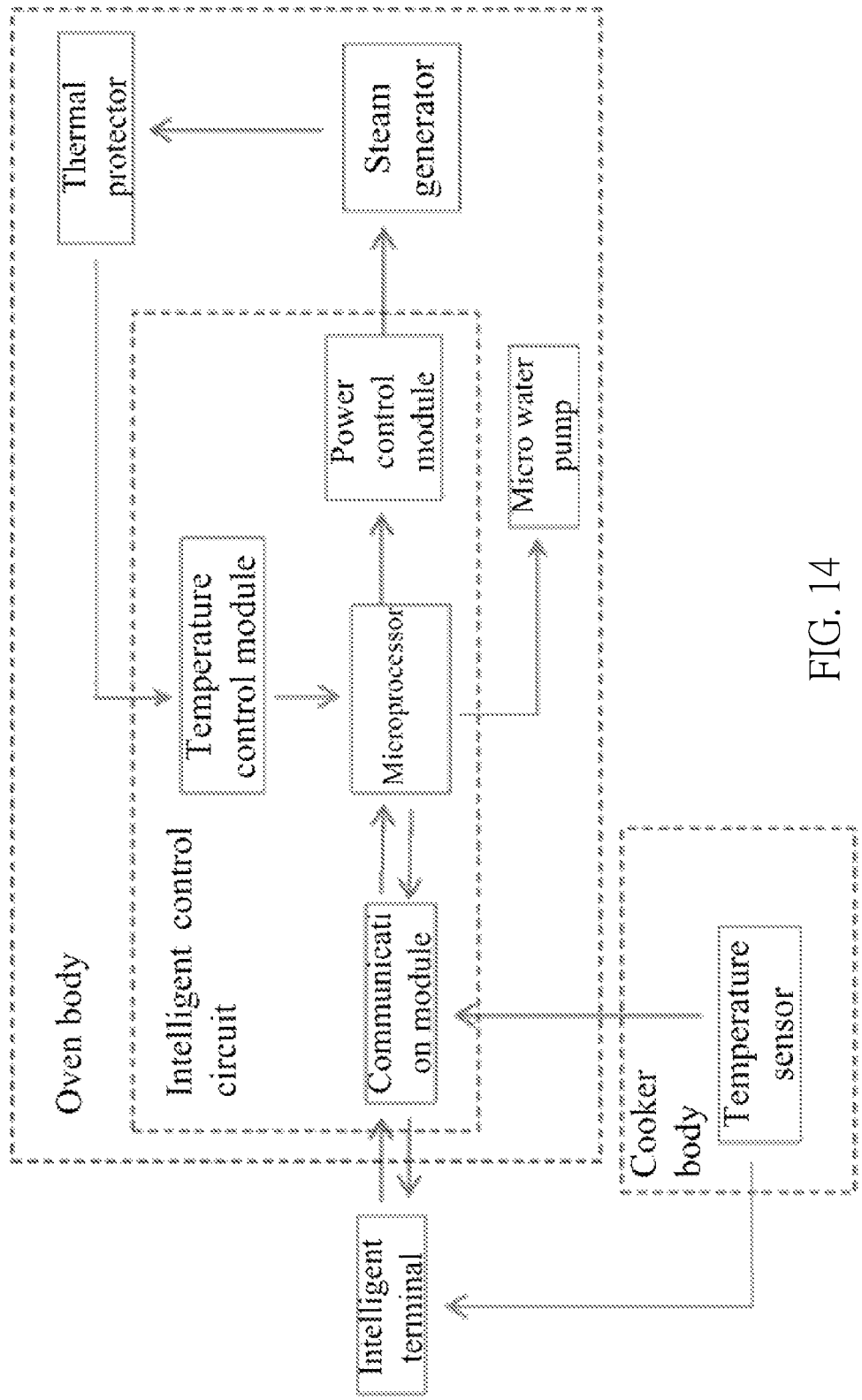
FIG. 14 is a working principle diagram of the mobile-phone controlled intelligent steam cooker having double pots according to the present invention.
Figure 15:
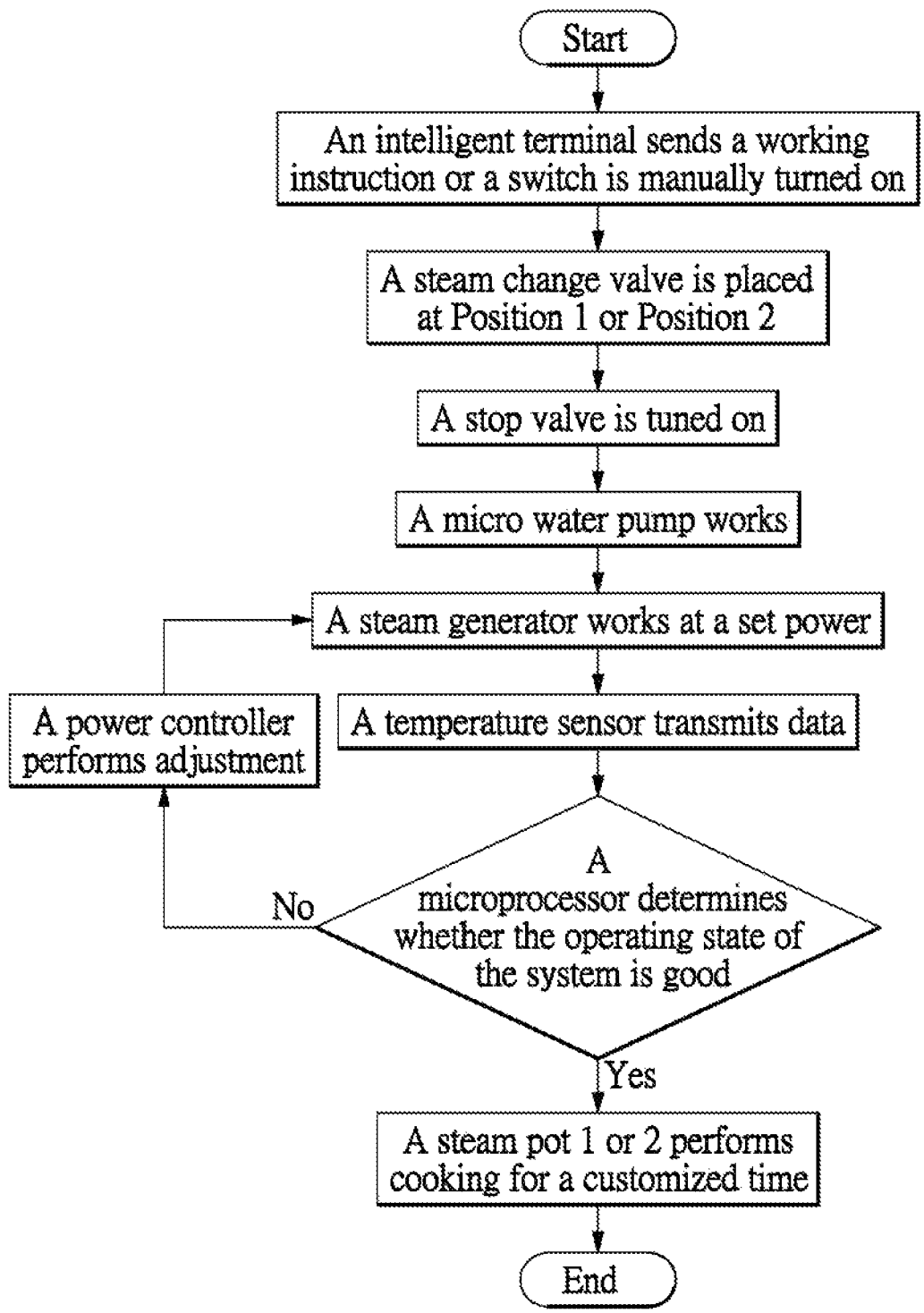
FIG. 15 is a working flowchart of the mobile-phone controlled intelligent steam cooker having double pots according to the present invention.

As shown in FIG. 8 to FIG. 10, the differences between Embodiment 3 and Embodiment 2 lie in that, the leakproof check valve is a silencing leakproof check valve, and the silencing leakproof check valve includes a valve seat 1, a valve plug 2, a valve plug spring 3, a leakproof seal ring 4, a valve cover 5, and a silencer 6; the silencer 6 includes a silencing cover 601 and a reed 602; the silencing cover 601 and the reed 602 are connected by using a rivet 603, pins of the reed 602 are installed in a groove of the valve cover 5, the silencing leakproof check valve is fixed on the steam cooker body 7 through connection of the valve seat 1 and the valve cover 5, a valve seat seal ring 9 is provided between the valve seat 1 and the steam cooker body, the valve seat 1 is sleeved on an air inlet connector 10, the air inlet connector 10 is fixed on a steam oven 8 by using a locking nut 12, the air inlet connector 10 is provided with an O-shaped seal ring 11, and a connector seal ring 13 is provided between the air inlet connector 10 and the steam oven 8.

The reed 602 of the silencer is provided with four pins.

The leakproof seal ring 4 and the valve seat seal ring 9 are made of a silicon rubber material, the O-shaped seal ring 11 and the connector seal ring 13 are made of a silicon rubber material, and the remaining parts of the silencing leakproof check valve are made of a stainless steel material.

The valve cover 5 is provided with four air vents 501, and the air vents 501 are communicated with a cavity formed by the valve cover 5 and the silencing cover 601 and are eventually communicated with an inner cavity of the steam cooker body 7.

The silencing leakproof check valve has two states. The first state is a working state, in which steam enters the valve seat 1 through the air inlet connector 10, pushes the valve plug 2 to move upward against the resistance of the valve plug spring 3, and also the valve plug 2 drives the leakproof seal ring 4 to move upward; the steam enters the valve cover 5 through the leakproof seal ring 4, then enters the cavity formed by the valve cover 5 and the silencing cover 601 through the four air vents 501 on the valve cover 5, and finally enters the inner cavity of the steam cooker body 7. The second state is a closed state, in which the valve plug 2 drives the leakproof seal ring 4 to move downward under the effect of the valve plug spring 3, till the leakproof seal ring 4 is completely attached to an inclined plane of the valve seat 1, such that the steam in the steam cooker body 7 cannot flow back into the valve seat 1.

Embodiment 4

As shown in FIG. 11 to FIG. 15, a mobile-phone controlled intelligent steam cooker includes a cooker body 1 and an oven body 2. The oven body 2 is internally provided with a steam generator 21, a micro water pump 20, and a leakproof connection joint 22 connected to the cooker body 1. The leakproof connection joint 22 includes a joint cover 221, a joint seat 223, a joint core 226, and a semi-spherical piston 222. The joint cover 221 is provided with four air vents H, a leakproof gasket 224 is provided at a position where the joint cover 221 and the joint seat 223 are connected to the bottom of the cooker body 1, and an O-shaped heat-resistant gasket 225 is provided between the joint core 226 and the joint seat 223.

Further, the oven body 2 is also internally provided with a control circuit 23, and the control circuit 23 is a simple switch circuit, a microcomputer variable-frequency variable-voltage control circuit, or another intelligent control circuit capable of controlling temperature, power and time.

When the control circuit 23 is a simple switch circuit, the oven body 2 is provided with a switch for controlling the steam power and the working duration, and a double-pot oven is further provided with a switching controller for steam supply to a pot A and a pot B.

Further, when the control circuit 23 is an intelligent control circuit, the intelligent control circuit is composed of a temperature control module, a power control module, a time control module, a communication module, and a microprocessor.

The communication module in the intelligent control circuit is configured to wirelessly connect to an intelligent terminal for receiving an instruction sent by the intelligent terminal.

Persons skilled in the art may perform variations and modifications on the above embodiments according to the disclosure and teachings of the forgoing description. Therefore, the present invention is not limited to the specific embodiments disclosed and described above, and some modifications and variations made to the present invention shall fall within the scope of protection of the appended claims of the present invention. In addition, although some particular terms are used in the description, these terms are merely for ease of description and are not intended to limit the present invention.

What is claimed is:

1. A mobile-phone controlled intelligent steam cooker, wherein the intelligent steam cooker comprises a steam cooker, a remote control server and a mobile terminal; the steam cooker comprises a steam pot and a steam oven; the steam oven is internally provided with a water tank, a water pump, a steam generator, a check valve connector, and a leakproof check valve disposed in the steam pot and connected to the check valve connector; the steam oven is further internally provided with a power panel and a control panel; the control panel is installed with a remote Wi-Fi module and a microprocessor; the remote Wi-Fi module receives, over the Internet, an instruction from the mobile terminal forwarded by the remote server, and also sends, over the Internet, state information of the steam cooker and the latest cloud recipes provided by a developer from the remote server to the mobile terminal; and the steam oven is further provided with an operation panel.

2. The mobile-phone controlled intelligent steam cooker according to claim 1, wherein the mobile terminal is a smart phone that runs APPs supporting Android and IOS phone operating systems.

3. The mobile-phone controlled intelligent steam cooker according to claim 1, wherein the leakproof check valve on the steam pot is configured to be directly sleeved on the check valve connector on the steam oven, and the check valve connector is provided with an O-shaped silicon rubber seal ring.

4. The mobile-phone controlled intelligent steam cooker according to claim 1, wherein the water tank is annular, provided with a water outlet at the bottom, made of high-strength organic glass, and provided with measurement marks on the surface, a top cover of the water tank being provided with 2 to 6 LED lamps, wherein each of the LED lamps is a color changing LED lamp.

5. The mobile-phone controlled intelligent steam cooker according to claim 1, wherein the leakproof check valve is a silencing leakproof check valve; the silencing leakproof check valve comprises a valve seat, a valve plug, a valve plug spring, a leakproof seal ring, a valve cover, and a silencer; the silencer comprises a silencing cover and a reed; the silencing cover and the reed are connected by using a rivet, pins of the reed are installed in a groove of the valve cover, the silencing leakproof check valve is fixed on the steam cooker body through connection of the valve seat and the valve cover, a valve seat seal ring is provided between the valve seat and the steam cooker body, the valve seat is sleeved on an air inlet connector, the air inlet connector is fixed on the steam oven by using a locking nut, the air inlet connector is provided with an O-shaped seal ring, and the reed of the silencer is provided with four pins; the leakproof seal ring and the valve seat seal ring are made of a silicon rubber material, the O-shaped seal ring is made of a silicon rubber material, and the remaining parts of the silencing leakproof check valve are made of a stainless steel material; the valve cover is provided with four air vents, and the air vents are communicated with a cavity formed by the valve cover and the silencing cover and are eventually communicated with an inner cavity of the steam cooker body.

6. The mobile-phone controlled intelligent steam cooker according to claim 5, wherein the leakproof check valve comprises the valve cover, the valve seat, the valve plug, the valve plug spring, and a connection joint; the valve plug is provided with the leakproof seal ring, and in a non-working state, an inclined plane of the leakproof seal ring is closely attached to an inclined plane of the valve seat; the valve seat and the valve cover are connected to the cooker body, a valve seat seal gasket is provided between the valve seat and the cooker body, the valve plug and the valve plug spring are placed in a cavity of the valve seat, an O-shaped seal ring is provided between the connection joint and the inner cavity of the valve seat, the connection joint is fixedly connected to the oven body of the steam cooker, and a joint seal gasket is further provided between the connection joint and the oven body of the steam cooker; the leakproof seal ring and the O-shaped seal ring are made of a silicon rubber material; the valve cover is provided with air vents, the air vents are communicated with an inner cavity of the cooker body, the valve cover is provided with 4 to 6 air vents; the valve cover, the valve seat, the valve plug, and the connection joint are made of a stainless steel material, and the valve plug spring is made of a stainless spring steel wire.

7. A mobile-phone controlled intelligent steam cooker, comprising a cooker body and an oven body, wherein the oven body is internally provided with a steam generator, a micro water pump, and a leakproof connection joint connected to the cooker body; the leakproof connection joint comprises a joint cover, a joint seat, a joint core, and a semi-spherical piston; the joint cover in the leakproof connection joint is provided with four air vents, a leakproof gasket is provided at a position where the joint cover and the joint seat are connected to the bottom of the cooker body, and an O-shaped heat-resistant gasket is provided between the joint core and the joint seat; the oven body is further internally provided with a control circuit, the control circuit is a simple switch circuit, a microcomputer variable-frequency variable-voltage control circuit, or another intelligent control circuit capable of controlling temperature and time; the intelligent control circuit is a circuit composed of a temperature control module, a power control module, a time control module, a communication module, and a microprocessor; and the communication module in the intelligent control circuit is configured to wirelessly connect to an intelligent terminal for receiving an instruction sent by the intelligent terminal.

\* \* \* \* \*